United States Patent [19]

Smeitink

[11] Patent Number: 4,913,459

[45] Date of Patent: Apr. 3, 1990

[54] WHEEL TROLLEY

[75] Inventor: Jan Smeitink, Aw Venray, Netherlands

[73] Assignee: Quickwheel Holding, B.V., Rotterdam, Netherlands

[21] Appl. No.: 221,740

[22] Filed: Jul. 20, 1988

[51] Int. Cl.⁴ .......................... B62B 3/02; B62B 3/12

[52] U.S. Cl. .................................. 280/641; 280/79.4; 414/430; 414/537

[58] Field of Search ..................... 280/79.1 A, 79.1 R, 280/639, 641, 47.13 R, 47.15, 11.23, 80 B, 62, 79.11, 79.4, 47.131, 149.2; 414/430, 537, 426; 180/906

[56] References Cited

U.S. PATENT DOCUMENTS

| | | | |
|---|---|---|---|
| 607,329 | 7/1898 | Beebe | 414/430 |
| 637,650 | 11/1899 | Northrop | 280/79.1 R |
| 781,243 | 1/1905 | Thompson | 280/651 |
| 831,472 | 9/1906 | Richardson | 414/469 |
| 857,660 | 6/1907 | Norwood | 414/430 |
| 863,122 | 8/1907 | Weber | 414/430 |
| 1,275,716 | 8/1918 | Maurer, Jr. | 414/429 |
| 1,970,159 | 8/1934 | Zehnbauer | 414/430 |
| 2,198,438 | 4/1940 | Knapp | 414/430 |
| 2,226,521 | 12/1940 | McNamara | 414/430 |
| 2,247,717 | 7/1941 | Sutter | 414/430 |
| 2,259,399 | 10/1941 | Sutter | 414/430 |
| 2,358,864 | 9/1944 | Lockwood | 414/430 |
| 2,414,383 | 1/1947 | Merriam | 414/430 |
| 2,491,318 | 12/1949 | Knapp | 414/430 |
| 3,224,611 | 12/1965 | Smuck | 414/430 |
| 3,720,422 | 3/1973 | Nelson | 280/79.1 A X |
| 3,830,388 | 8/1974 | Mott | 414/428 X |
| 3,954,198 | 5/1976 | Sedelmayer | 414/429 |
| 4,350,470 | 9/1982 | Murillo | 414/430 |
| 4,465,421 | 8/1984 | Murillo | 414/430 |
| 4,726,727 | 2/1988 | Tyler | 414/430 |

FOREIGN PATENT DOCUMENTS

| | | | |
|---|---|---|---|
| 415050 | 9/1946 | Italy | 280/62 |

*Primary Examiner*—Charles A. Marmor
*Assistant Examiner*—Tamara L. Finlay
*Attorney, Agent, or Firm*—Kenyon & Kenyon

[57] ABSTRACT

The present invention relates to a trolley for supporting a tire of a vehicle so that the latter can be moved without the tire touching the ground. More specifically, the apparatus of the present invention comprises a foldable frame equipped with at least one front wheel and two rear wheels, self adjusting and locking front and rear support members having a plurality of parallel rows of rollers, the outermost rollers being bevelled to help center the vehicle tire on the tolley and to minimize the tendency of the vehicle tire to roll out of the trolley. The rear support member serves as a drive-on ramp for the vehicle tire, rotating about its axle under the pressure exerted by the tire being driven thereupon as the tire reaches a certain distance from the beginning of the part. When in a tilted position, the rear support member and the front support member automatically lock into position and support said vehicle tire.

11 Claims, 4 Drawing Sheets

WHEEL TROLLEY

FIELD OF THE INVENTION

The present invention relates to a trolley for supporting a tire of a vehicle so that the latter can be moved without the tire touching the ground. More specifically, the apparatus of the present invention comprises a foldable frame equipped with at least one front wheel and two rear wheels and self adjusting and locking front and rear support members, each support member attached to its own axle mounted transversely to the trolley frame, the rear support member serving as a drive-on ramp for the vehicle tire.

BACKGROUND OF THE INVENTION

Apparatus for supporting the tire of a vehicle so that the latter can be moved without touching the ground are well known. Typically, the apparatus comprises a plurality of wheels attached to a frame adapted to support the vehicle tire and a means for mounting the vehicle tire onto the means for support.

A variety of alternative frames, supports, and mounting members are known. In English patent application no. 2,109,313, Murillo discloses a three-wheeled trolley for use with vehicles having a flat or damaged tire. The vehicle tire is driven onto the trolley via a drive-on part which is rotated into position and then is clamped fast, the tire being supported at the rear side by the drive on part and resting at the front end against another supporting part which is also rotatable, while the bottom of the tire rests on the floor of a tray which hangs under the frame. In order to insure that the trolley remains in place when driving a tire onto it, the drive-on part is equipped on its underside with a protruding part which, in the non-rotated condition, lifts up the trolley, so that the rear wheels are free from the surface below.

This known trolley has a number of disadvantages, as for example the need for a separate clamp to prevent dislodging of the tire when the trolley is driving along bumpy road or otherwise subjected to pressures which tend to dislodge it. Further, the trolley has relatively large dimensions, which makes it difficult to carry or fit in a vehicle's storage area.

In. U.S. Pat. No. 4,726,727, Tyler discloses a six-wheeled trolley with a drive-on ramp, two braking systems to prevent movement of the trolley while mounting or dismounting a disabled vehicle tire, and a means to connect the trolley to the vehicle for safety and support while the vehicle and trolley are moving.

Tyler's trolley has a number of disadvantages, including the inherent instability of the disabled tire resting on a surface that is relatively flat, thereby not allowing the wheel to be sufficiently well-seated to withstand the forces that tend to dislodge it while the vehicle is in motion, thus necessitating attachment of the trolley to the vehicle. Further disadvantages include bulkiness, and closely spaced running wheels that increase the chances of the trolley being dislodged by irregularities in the surface upon which it is being driven. Moreover, the placement and large numbers of its wheels make turning of the vehicle more difficult and contribute to the instability of the vehicle tire on the trolley. Further, the Tyler trolley cannot be folded up for ease of handling and storage.

In U.S. Pat. No. 2,358,864, Lockwood discloses a wheel trolley comprising three wheels mounted on a frame, a drive-on part, and several fixed support members. Lockwood's apparatus suffers from several disadvantages, including the lack of a hinged frame, which causes the trolley to take up significant space when it is stored, and the requirement that the tire be supported in at least five points in order to achieve stability while in use.

In U.S. Pat. No. 3,720,422, Nelson discloses a trolley with an adjustable frame, but without a drive-on part. A disabled tire is mounted on the trolley by first jacking up the vehicle, then placing the trolley in position and lowering the tire onto it. The disadvantages of this apparatus are obvious as the driver of the vehicle is forced to spend time and considerable energy jacking up the car in order to use the trolley. Further, in this device lateral support for the vehicle tire is minimal, leaving the trolley vulnerable to accident in the event that it hits a large hole or object, or is subjected to forces that tend to dislodge the tire, such as sharp turns or fast stops.

In U.S. Pat. No. 3,583,723, Nowell teaches a trolley similar to that described by Nelson in that no drive-on part is provided. Further, as with Nelson, the three-sided trolley frame disclosed is inherently weaker than a four-sided frame as taught by the present invention.

In U.S. Patent Nos. 4,350,470 and 4,465,421, Murillo teaches a three-wheeled trolley with a drive-on part and support shelf hanging below the frame. Murillo does not teach a foldable frame nor does he teach self-adjusting and locking support members.

U.S. Ser. No. 044,810, with the same inventor and commonly assigned with the present invention, also discloses a wheel trolley with a foldable frame. Although this wheel trolley is said to perform satisfactorily, a couple of problems still exist, including the need to manually lock the support members into position once the tire has been driven onto the trolley or to rely upon the vehicle weight alone to hold the members in position, and the possibility, particularly if the disabled tire is a powered tire, of the tire running up the front support member at certain accelerations.

OBJECTS AND SUMMARY OF THE INVENTION

It is an objective of the present invention to provide a trolley for supporting a disabled vehicular member, wherein the trolley has a foldable frame.

Another objective of the present invention is to provide a foldable wheel trolley having self adjusting support members.

Another objective of the present invention is to provide a foldable wheel trolley having self adjustable and locking support members.

Another objective of the present invention is to provide a foldable wheel trolley having a foldable frame equipped with at least one front and two rear wheels, self-adjusting and locking front and rear support members each attached to an axle mounted transversely to said frame, the rear support member serving as a drive-on ramp for the vehicle tire and rotating about the axle under the pressure exerted by a tire being driven thereupon as the tire reaches a certain distance from the beginning of the ramp.

Another objective of the present invention is to provide a wheel trolley comprising a foldable frame equipped with at least one front and two back wheels, self adjusting and locking front and rear support members attached to separate axles mounted transversely to the frame, the front support member having a plurality of parallel rows of rollers to help prevent the tire from rolling out of the trolley, the rear support serving as a drive on ramp for the vehicle tire, the rear support rotating about its axle under pressure exerted by a tire being driven thereupon as the tire reaches a certain distance from the beginning of the part.

Another objective of this invention is to provide a wheel trolley that can be easily stored and carried, and which can be quickly and safely attached to a disabled tire by the user with a minimal investment of time and energy.

Another objective of this invention is to provide a wheel trolley which is easy to use, and which does not require any great degree of strength, training, or knowledge to use effectively.

Another objective of this invention is to provide a wheel trolley suitable to replace the conventional spare tires used in most automobiles.

Briefly, a preferred embodiment of the present invention provides a wheel trolley comprising a foldable frame equipped with at least one front and two rear wheels, and self adjusting and locking front and rear support members attached to axles mounted transversely to the frame, the front support member having a plurality of rollers to minimize the tendency of the vehicle tire to roll out of the trolley. The outermost rollers are bevelled, e.g. conically shaped, to help center the vehicle tire on the trolley. The rear support member serves as a drive-on ramp for the vehicle tire, the pressure exerted by a tire being driven a certain distance from the beginning of the rear support causing it to rotate about its axle. When in a tilted position the rear and front support members automatically lock into position and support the vehicle tire.

An important advantage of the present invention is the inclusion of self adjusting and self locking support members that allow the user to quickly, safely and properly use the wheel trolley. It is another advantage of the present invention that the self adjusting and self locking support members assure optimum orientation of the supports so that as the vehicle is moving the tire is well secured so as to resist the forces that would tend to dislodge it. It is another advantage of the present invention for the outermost rollers on the front support to be bevelled, with their narrowest portion being oriented toward the longitudinal inner surface of the frame, so that said outermost rollers can come into contact with the tire laterally of the tread and bring about centering of the vehicle tire. It is still another advantage of the present invention to provide a folding frame so that the wheel trolley may be easily transported and stored.

These and other objectives and advantages of the present invention will be apparent to those skilled in the art from the following detailed description and drawings.

DETAILED DESCRIPTION OF THE INVENTION

Figure 1:
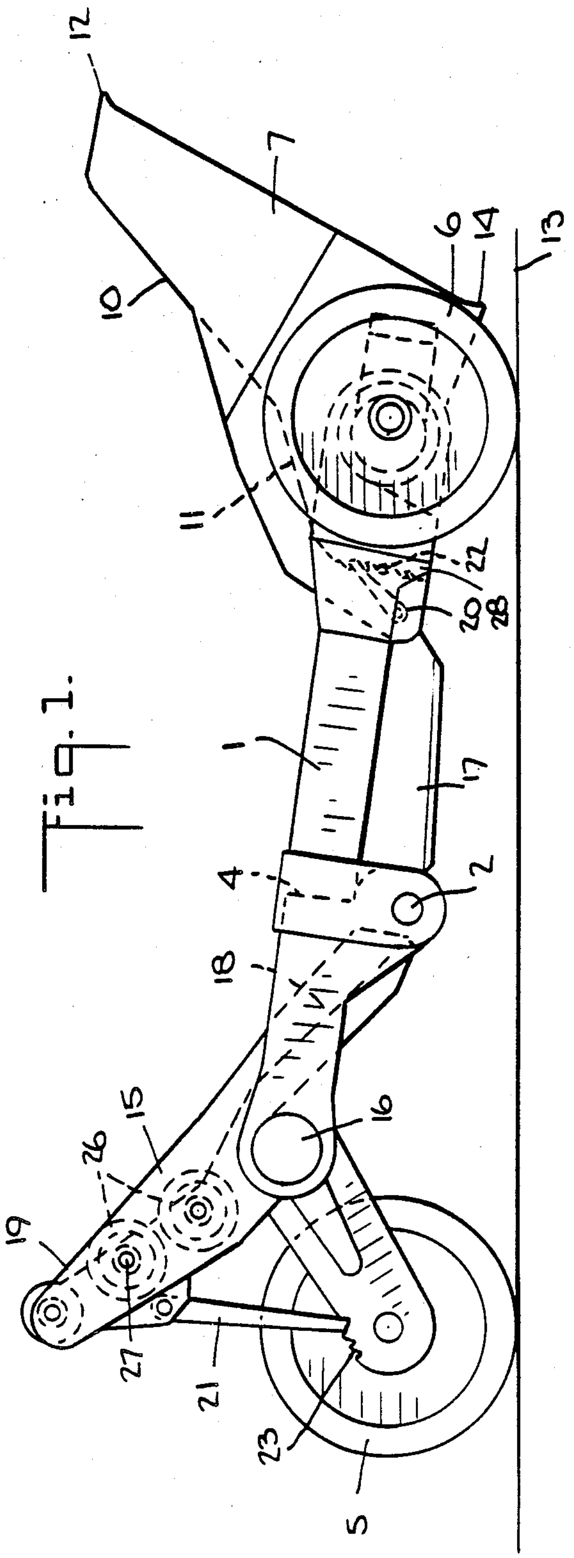
FIG. 1 is a side view of a wheel trolley constructed in accordance with the present invention as it appears after a vehicle tire has been driven onto it causing support members 7 and 15 to lock into position and support the tire.

The trolley shown in the drawings comprises a frame 1 provided with a hinge axle 2 which is oriented crosswise to the longitudinal center plane 3 (FIG. 2) of the frame and which makes it possible to collapse the trolley. In the operational position illustrated in FIG. 1, support surfaces 4 of the two parts of the frame 1 rest against each other in order to maintain the illustrated position under the weight of a wheel resting on the trolley.

The trolley has one front wheel 5 and two rear wheels 6. In the collapsed position the front wheel 5 comes to rest between the two rear wheels 6. When the trolley is in use, the wheels serve to transport a tire in a stable manner. The number of trolley wheels is not an essential element of this invention; alternate configurations which carry out the functions described herein are also within the scope of this invention.

The trolley further comprises a rear support member 7 rotatable about a shaft (not shown) located slightly in front of the axle 9 of the rear wheels 6. The rear support member has a drive-up surface 10 and a surface 11 located in front of the rotary shaft. When the rear support member 7 is turned down, two edges 12 and 14 thereof comes to rest on the roadway 13, and a tire can be driven over the surface 10 onto the trolley, whereupon the support member 7 begins to rotate into the illustrated position as soon as the tire reaches the surface 11.

When the rear support member 7 is turned down the rear wheels 6 do not touch the roadway 13; the rear of the trolley rests on the edges 12 and 14.

The trolley further comprises a front support member 15 hingedly supported around an axle 16 and extending on both sides of said axle 16. A tire driven onto the trolley comes to be located in a depressed portion 17 of the frame 1 and then rests against the rearmost surface portion 18 of the support member 15 which is thereby turned upward, so that the anterior portion 19 thereof likewise moves toward the tire. The tire is then held fast between the two support members 7 and 15.

When the support members 7 and 15 are raised, they adjust to the dimensions of the tire. In order to maintain this setting, the support members 7 and 15 are provided with pawls 20 and 21, respectively, which cooperate with teeth 22 and 23, respectively, rigidly attached to the frame 1 and which are provided with pressure springs (30 and 31). When the support members are turned up, the pawls 20 and 21 are moved along the corresponding teeth 22 and 23, respectively, with the result that the position last assumed is secured. After the vehicle has been elevated in order to change the tire, these teeth can be disengaged from the pawls.

The front support member 15 is further provided with a plurality of rollers 26, supported in a freely rotatable manner on axles 27 oriented perpendicularly to the longitudinal center plane 3 of the trolley. When the tire being carried is a drive wheel, it will normally be held by friction against the rear support member 7 and possibly against wall portions of the depressed portion 17, so that only the other wheel will provide the drive. When there is excessive acceleration of the engine, the wheel will tend to disengage itself from the rear support member 7 and to start to rotate, but this rotation is accommodated by the rollers 26, so that any tendency of the wheel to roll out of the trolley is suppressed.

Figure 2:
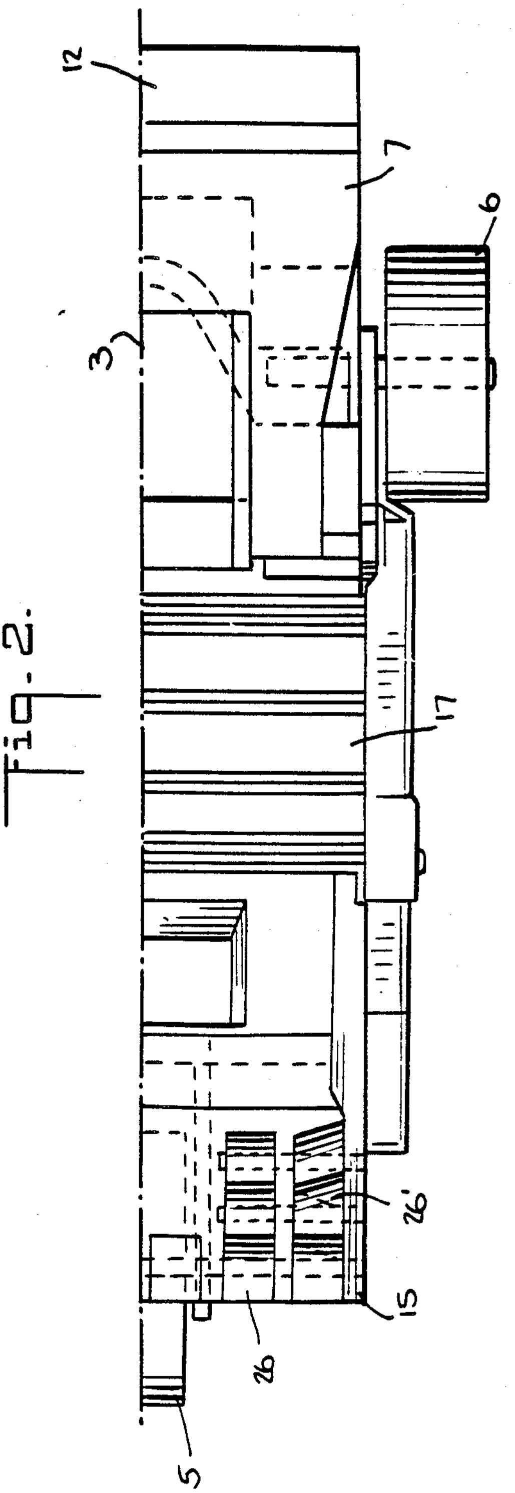
FIG. 2 is a partial overhead view of the same trolley shown in the same position as in FIG. 1.
Figure 3:
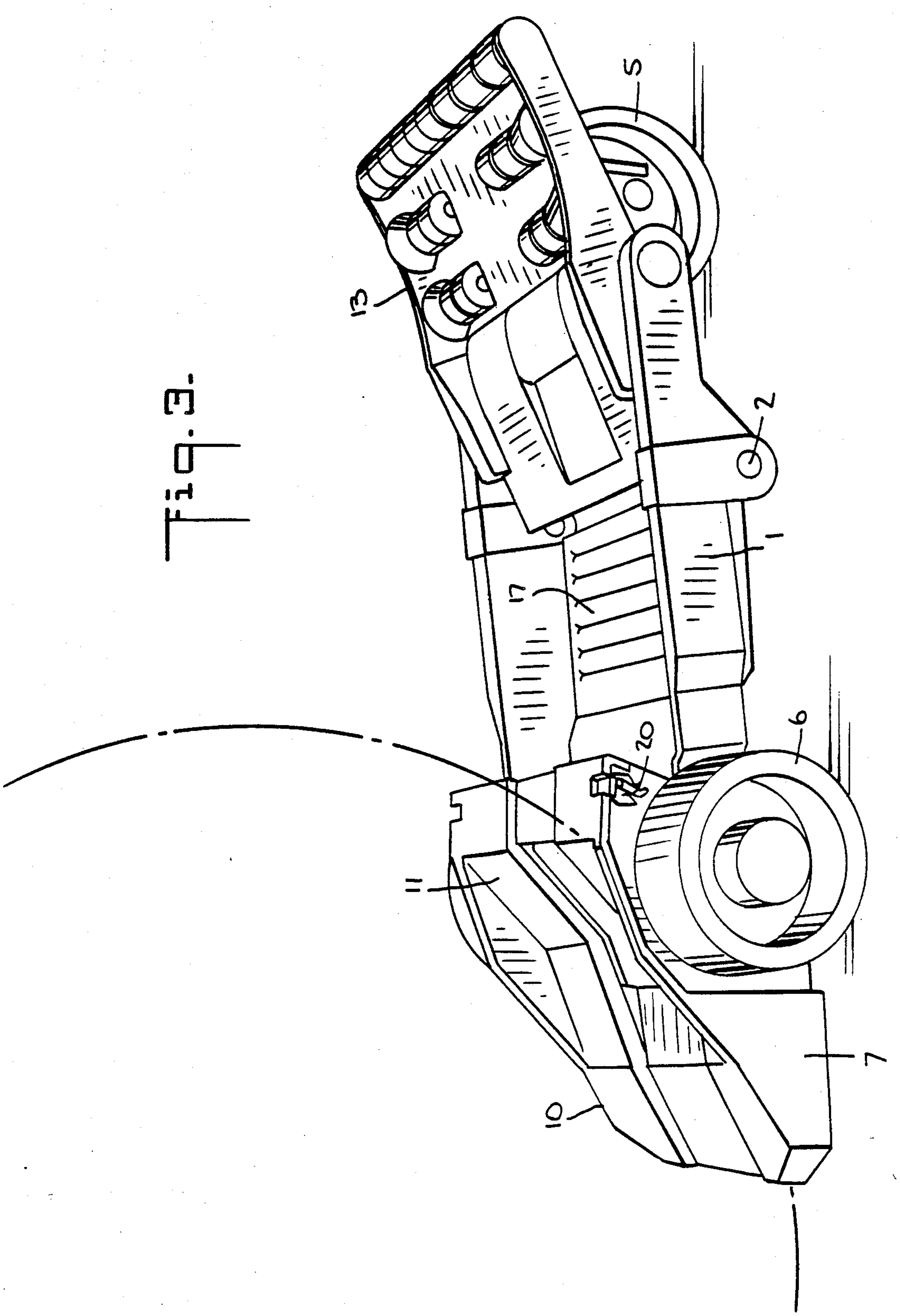
FIG. 3 is a partial side view of a wheel trolley with the ramp down, ready to receive a tire.
Figure 4:
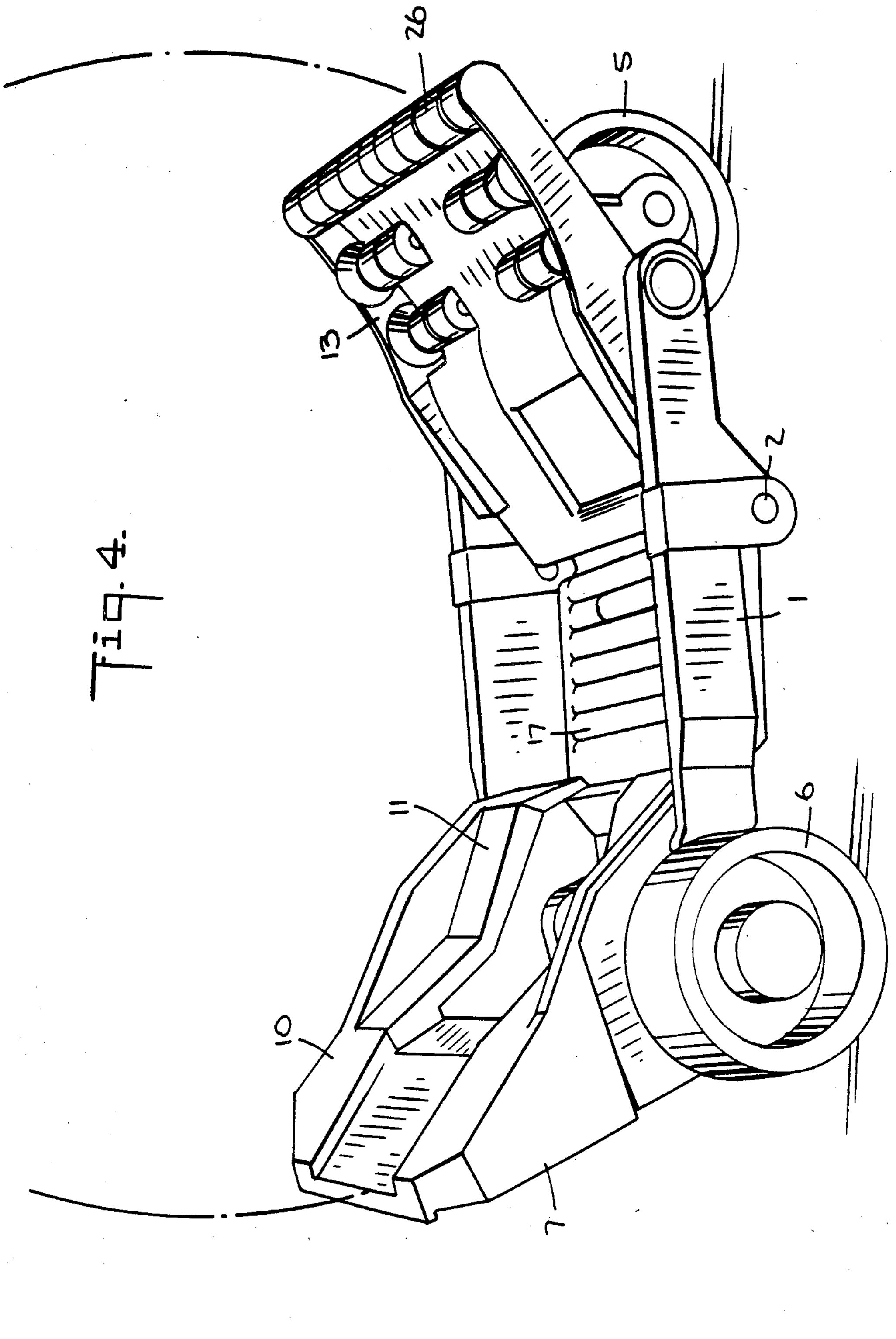
FIG. 4 is a partial side view of a wheel trolley with the support members in a locked position.
Figure 5:
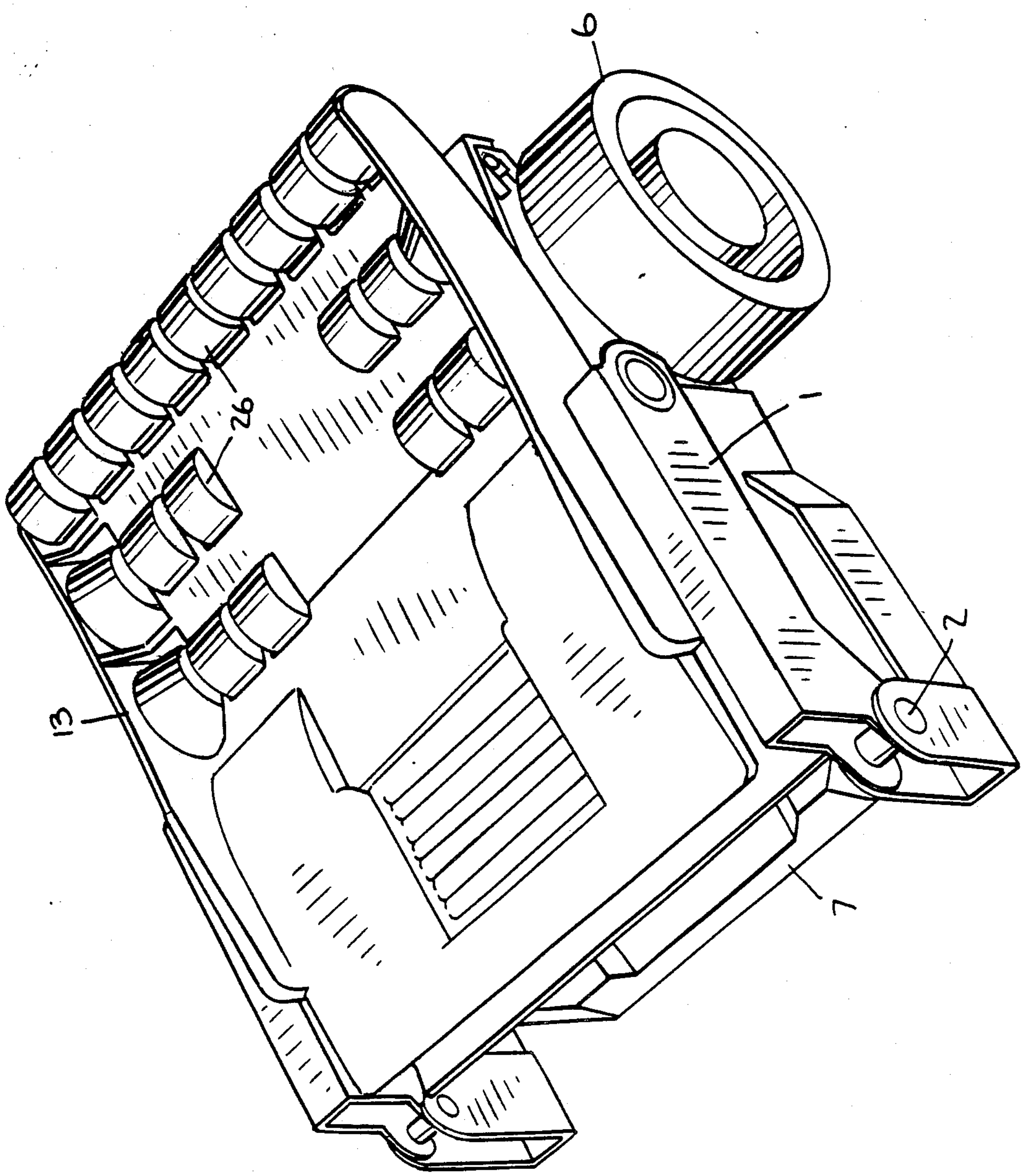
FIG. 5 is a partial side view of a wheel trolley in the folded position.

As can be seen from FIG. 2, a plurality of parallel rows of rollers 26 can be installed, of which in particular the outer rollers 26' are conical in design, so that they contribute to the centering of the tire because they grip the tire portions located laterally of the tread.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A wheel trolley, for supporting a tire of a vehicle, comprising:

a frame; said frame having a front, a rear, and two sides;

wheels rotatably mounted to the front and rear of said frame;

self-locking and adjusting front and rear support members rotatably attached to the frame, said rear support member serving as a drive-ramp for a tire;

said front support member rotating into a first upright tire support position and said rear support member rotating into a second upright tire support position in response to contact with a tire being driven thereon; and first and second locking means for locking the support members in place once a tire is driven onto said trolley and said support members have rotated into said first and second upright tire support positions.

2. A wheel trolley according to claim 1 wherein said front support member further comprises a plurality of freely rotatable rollers extending transversely across said support member; said rollers including outermost rollers located along an outside edge of said rollers.

3. A wheel trolley according to claim 2 wherein the outermost rollers are bevelled to center the tire on the trolley.

4. A wheel trolley according to claim 3 wherein said outermost rollers are conically shaped.

5. A wheel trolley according to claim 1 wherein said locking means comprises two pawls, one attached to each support member, and two sets of teeth attached to the frame of the wheel trolley, said teeth and pawls arranged so that each pawl engages a separate set of teeth as the support members rotate upward to support a tire that has been driven onto the trolley, locking the support members so that they cannot rotate downward.

6. A wheel trolley according to claim 1 wherein the rear support member has edges which rest on the roadway when the rear support member is turned down into the tire loading position, said edged protruding far enough to hold said rear wheels above the roadway.

7. A wheel trolley according to claim 1 wherein said front support member is rotatably about a first axle attached to the front of the frame, and said rear support member is rotatable about a second axle attached to the rear of the frame, said first and second axles mounted transversely between said side members with respect to the frame.

8. A wheel trolley, for supporting a tire, comprising:

a frame having a hinge axle oriented transversely;

a front wheel and two back wheels each rotatably mounted on axles transversely attached to said frame;

a rear support member rotatable about a shaft which is transversely attached to said frame and located in front of the rear wheel axle, said rear support member having a drive-up surface to the rear of the shaft and a surface located forward of the shaft;

a front support member hingedly supported about an axle transversely attached to the frame, said front support member having surfaces extending both forward and rearward of its axle, and having a plurality of rollers supported in a freely rotatable manner on axles that are parallel to the axle of the front support member, said rollers being arranged in parallel rows, the rollers in the outermost rows being bevelled to contribute to the centering of the tire in the trolley; and a locking means effective to prevent the front and rear support members from rotating downward once the support members have been raised by the force of the tire being driven onto the trolley, said locking means comprising, for each support member, a pawl attached to said support member and teeth rigidly attached to the frame, said teeth cooperating and engaging with said pawl, and further comprising a pressure spring attached to each pawl.

9. A wheel trolley according to claim 8 wherein the rear support member has edges which rest on the roadway when the rear support member is turned down, said edges protruding far enough to hold the rear wheels above the roadway.

10. A wheel trolley according to claim 8 wherein the parts are shaped to compactly nest together when the frame is folded about the hinge, with the front wheel nesting between the rear wheels.

11. A wheel trolley for supporting a tire of a vehicle comprising:

a frame;

said frame having a front, a rear, and two sides;

wheels rotatably mounted to the front and rear of said frame;

self-locking and adjusting front and rear support members attached to said frame; said rear support member serving as a drive-on ramp for a tire;

said front support member rotating into a first upright tire support position and said rear support member rotating into a second upright tire support position in response to contact with a tire being driven onto said trolley; and first and second locking means for locking said support members into said first and second upright tire support positions;

said locking means comprising two pawls, one attached to each support member, and two sets of teeth attached to the frame of said trolley; said teeth and pawls arranged so that each pawl engages a separate set of teeth as the support members rotate upward to support a tire that has been driven onto said trolley, thereby locking the support members so that they cannot rotate downward.

* * * * *